United States Patent
Hamilton et al.

(10) Patent No.: US 12,443,341 B1
(45) Date of Patent: Oct. 14, 2025

(54) MEMORY CONTROLLER WITH SPECULATIVE PRECURSOR COMMANDS

(71) Applicant: Arm Limited, Cambridge (GB)

(72) Inventors: Thomas H. Hamilton, Hutto, TX (US); Matthew Derrick Garrett, Austin, TX (US); Manan Chugh, Cedar Park, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/670,827

(22) Filed: May 22, 2024

(51) Int. Cl.
*G06F 3/06* (2006.01)

(52) U.S. Cl.
CPC .......... *G06F 3/0604* (2013.01); *G06F 3/0659* (2013.01); *G06F 3/0673* (2013.01)

(58) Field of Classification Search
CPC ..... G06F 3/0604; G06F 3/0659; G06F 3/0673
See application file for complete search history.

(56) References Cited

U.S. PATENT DOCUMENTS

| | | | | |
|---|---|---|---|---|
| 2023/0141789 A1* | 5/2023 | Cho | ..................... | G11C 11/4093 365/222 |
| 2023/0185460 A1* | 6/2023 | Kim | ..................... | G06F 3/0653 711/105 |
| 2024/0038292 A1* | 2/2024 | Kim | ..................... | G11C 11/4085 |
| 2024/0103763 A1* | 3/2024 | Islam | ..................... | G06F 3/0673 |
| 2025/0140300 A1* | 5/2025 | Putti | ................. | G11C 11/40618 |

* cited by examiner

*Primary Examiner* — Sean D Rossiter
(74) *Attorney, Agent, or Firm* — Leveque Intellectual Property Law, P.C.

(57) ABSTRACT

A memory controller includes a command scheduler, a timer and an interface configured to transmit memory access commands, including primary and secondary precursor memory access commands, to a memory. The command scheduler selects memory access commands associated with memory access requests. The timer indicates expiration of first and second time periods. The first time period is shorter than the second time period by a designated amount and the second time period is greater than or equal to a minimum time between a prior memory access command and a secondary precursor memory access command for the memory. The command scheduler allows selection of a primary precursor memory access command when the first time period has expired and allows selection of a secondary precursor memory access command when the second time period has expired.

20 Claims, 8 Drawing Sheets

FIG. 10

| cycle | cmd | bank | en1 | en2 |
|---|---|---|---|---|
| -2 | ACT1 | 2 | 1 | 0 |
| -1 | CAS | X | 0 | 0 |
| 0 | RD | 0 | 0 | 0 |
| 1 | ACT2 | 2 | 0 | 1 |
| 2 | RD | 1 | 1 | 0 |
| 3 | // | - | 1 | 0 |
| 4 | ACT1 | 3 | 1 | 0 |
| 5 | ACT2 | 3 | 0 | 1 |
| 6 | // | - | 1 | 0 |
| 7 | ACT1 | 4 | 1 | 0 |
| 8 | RD | 0 | 0 | 0 |
| 9 | ACT2 | 4 | 0 | 1 |
| 10 | RD | 1 | 1 | 0 |
| 11 | // | - | 1 | 0 |
| 12 | ACT1 | 5 | 1 | 0 |
| 13 | ACT2 | 5 | 0 | 1 |
| 14 | // | - | 1 | 0 |
| 15 | // | - | 1 | 0 |
| 16 | RD | 2 | 1 | 0 |
| 17 | // | - | 1 | 1 |
| 18 | RD | 2 | 1 | 1 |
| 19 | // | - | 1 | 1 | tRRD = 4×tCK

FIG. 11

| cycle | cmd | bank | en2 |
|---|---|---|---|
| -2 | // | - | 0 |
| -1 | CAS | X | 0 |
| 0 | RD | 0 | 0 |
| 1 | ACT1 | 2 | 1 |
| 2 | RD | 1 | 1 |
| 3 | ACT2 | 2 | 1 |
| 4 | // | - | 0 |
| 5 | // | - | 0 |
| 6 | ACT1 | 3 | 0 |
| 7 | ACT2 | 3 | 1 |
| 8 | RD | 0 | 0 |
| 9 | // | - | 0 |
| 10 | RD | 1 | 0 |
| 11 | ACT1 | 4 | 1 |
| 12 | ACT2 | 4 | 1 |
| 13 | // | - | 0 |
| 14 | // | - | 0 |
| 15 | ACT1 | 5 | 0 |
| 16 | ACT2 | 5 | 1 |
| 17 | // | - | 0 |
| 18 | RD | 2 | 0 |
| 19 | // | - | 0 |
| 20 | // | - | 1 |
| 21 | // | - | 1 |
| 22 | // | - | 1 |
| 23 | // | - | 1 |
| 24 | RD | 2 | 1 | tRRD = 4×tCK

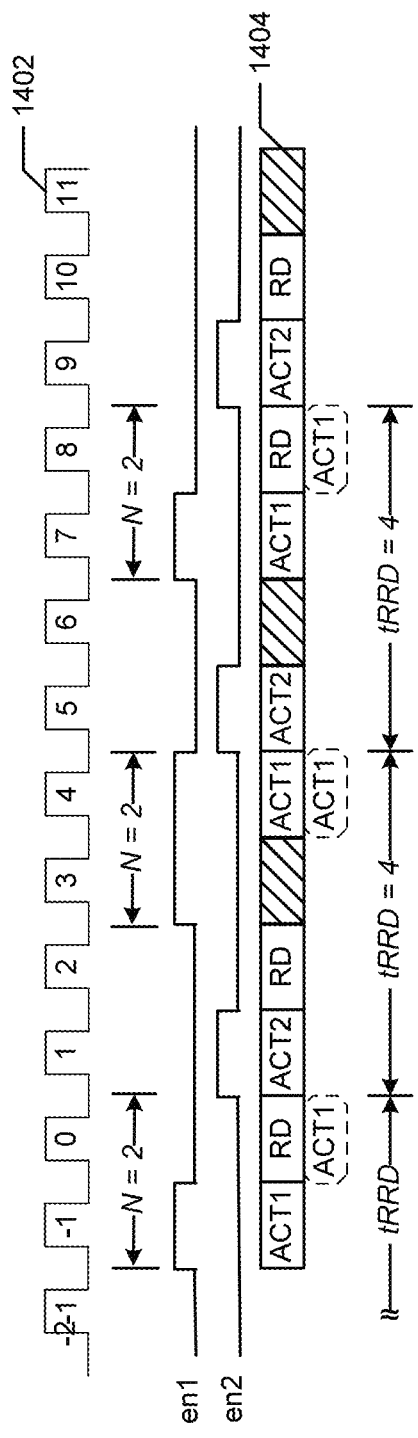
*FIG. 14*
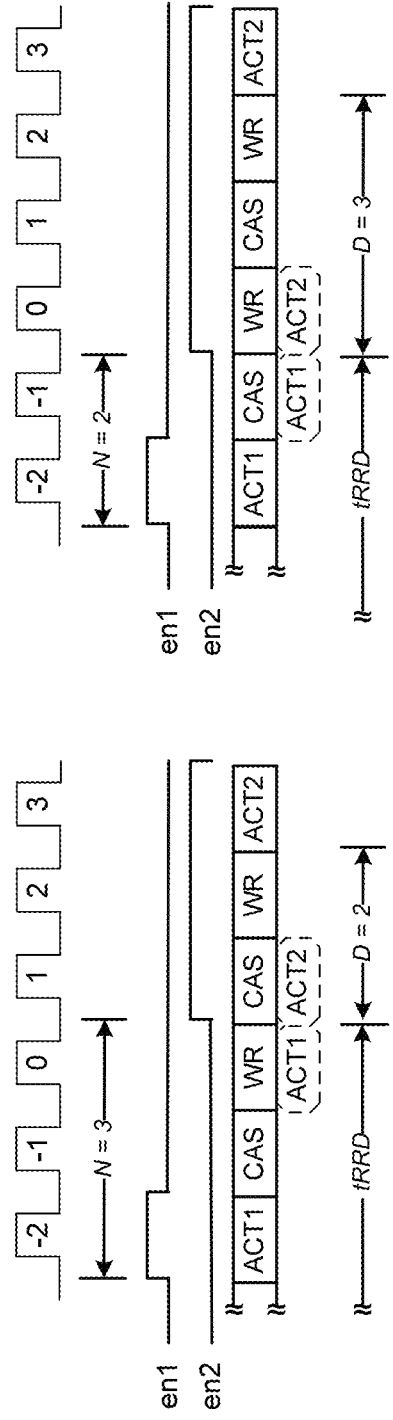
*FIG. 15*
*FIG. 16*

MEMORY CONTROLLER WITH SPECULATIVE PRECURSOR COMMANDS

BACKGROUND

A memory controller provides an interface between requesting device, such as a central processing unit (CPU) or input/output (I/O) device, and a memory device. Typically, the requesting device and the memory device are fabricated on separate dies or chips. In order to facilitate communication with a memory device, a number of protocols have been developed. Various standard protocols are available for accessing memory such as dynamic random-access memory (DRAM). These protocols specify a set of commands for controlling the memory device together with a physical interface to the memory device for sending commands and transferring data. In addition, communication with a memory device must satisfy a number of timing constraints.

In many memory devices, memory cells are arranged as a number of two-dimensional arrays or back. In a bank of a DRAM device, reading data stored at an address requires a sequence of operations. For example, a bank is selected, columns lines are pre-charged, a row is selected based on a row address, row charges are sensed and then columns are read based on a column address. These operations are implemented in response to commands from a memory controller. In particular, a read command for a column address must be preceded by one or more precursor commands.

A memory controller may seek to optimize data throughput by selecting the order in which memory access requests, received from a requesting device, are processed. This process is referred to as scheduling. In addition, the commands from the memory controller to the memory device may be scheduled to optimize data throughput within the timing constraints of the memory device.

BRIEF DESCRIPTION OF THE DRAWINGS

The accompanying drawings provide visual representations which will be used to describe various representative embodiments more fully and can be used by those skilled in the art to understand better the representative embodiments disclosed and their inherent advantages. In these drawings, like reference numerals identify corresponding or analogous elements.

FIG. 10 is a table showing a scheduled command sequence, in accordance with various representative embodiments.

FIG. 11 is a table showing a scheduled command sequence,

FIGS. 14-16 show diagrammatic representations of further scheduled command sequences, in accordance with various representative embodiments.

DETAILED DESCRIPTION

Figure 1:
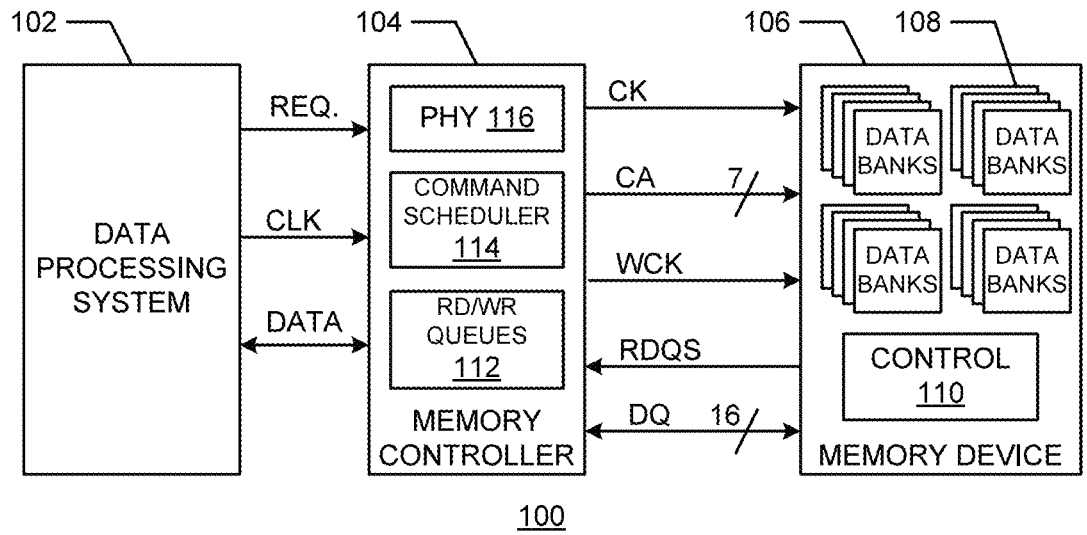
FIG. 1 is a simplified block diagram of a data processing system, in accordance with various representative embodiments.

The various apparatus and devices described herein provide mechanisms for improving the performance of a memory controller based on generating speculative precursor commands.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

The embodiments shown and described herein relate to the use of speculative precursor command in a Low Power, Double Data Rate, Dynamic Random-Access Memory (LPDDR DRAM) operating under a JEDEC® LPDRR5 or LPDDR5X standard protocol. However, the mechanisms described herein have application to other types of memory operating under other protocols. Various embodiments relate to memory operations in which a memory controller issues a sequence of two or more commands to perform a requested operation-such as a read or write operation, for example. When the sequence of commands can be "split," in that they can be interleaved with other commands, the disclosed mechanism provides additional flexibility to the command scheduler of the memory controller. In turn, this enables improved performance while still satisfying the timing constraints of a memory device.

FIG. 1 is a simplified block diagram of a data processing system 100, in accordance with various representative embodiments. Data processing system 100 includes request device 102, memory controller 104 and memory device 106. Memory controller 104 provides an interface between requesting device 102, such as processing unit or input/output (I/O) device, and memory device 106. In practice, data processing system may contain one or more requesting devices 102, one or more memory controllers 104 and one or more memory devices 106. Typically, requesting device 102 and memory device 106 are fabricated on separate dies. In order to facilitate communication with a memory device, a number of protocols have been developed. Standard protocols for accessing dynamic random-access memory (DRAM) have been published by the JEDEC® (Joint Electron Device Engineering Council) Committees of the Solid State Technology Association of the Electronic Industry Alliance (EIA), for example. These protocols specify a physical interface to the memory device, a set of commands for controlling the memory device and a data interface. In addition, communication with a memory device must satisfy a number of timing constraints.

In many memory devices, memory cells are arranged as a number of two-dimensional arrays or banks 108. In a bank of a DRAM device, for example, reading data stored at an address requires a sequence of operations. For example, a bank is selected, columns lines are pre-charged, a row is selected based on a row address, row charges are sensed and then columns are read based on a column address. These operations are implemented by control circuit 110 in response to commands from a memory controller. In particular, a read command for a column address must be preceded by one or more precursor commands.

Memory controller 104 includes read and write data queues 112 for storing memory access request received from requesting device 102, and a command generator and scheduler 113 for generating memory access commands to service the requests and scheduling the commands for sending to memory device 106 via physical interface (PHY) 116. Read and write data queues 112 may also store information, such as an identity of the requesting device, to enable read data to be returned to the requesting device.

A request signal may be transmitted from requesting device 102 to memory controller 104 on request line "REQ." Data may be transmitted between requesting device 102 and memory controller 104 on data bus "DATA" synchronously with a clock signal on line "CLK." Various interface architecture may be utilized.

In the embodiment shown, physical interface 116 is coupled to a 7-bit wide command bus and address bus "CA" that sends command signals synchronously with a command clock signal on clock line "CK". The command clock signal may be a differential signal. A write clock signal is transmitted on write clock line "WCK." Write data is transmitted to the memory device on a 16-bit wide, bi-directional data bus "DQ" synchronously with the write clock signal. Read data is also transmitted on the bi-directional data bus "DQ," but is sent synchronously with a data strobe signal on line "RDQS." The data strobe signal is derived from the write clock on line WCK. For low power applications, the WCK clock signal is only generated when data is to be transferred, in which case a short synchronization sequence may be transmitted before data is transmitted together with a synchronization command. The synchronization command may be considered to be another precursor command.

A memory controller may seek to optimize data throughput by selecting the order in which memory access requests, received from a requesting device, are processed. This process is referred to as scheduling. In addition, the commands from the memory controller to the memory device may be scheduled to optimize data throughput within the timing constraints of the memory device.

LPDDR5 and LPDDR5X commonly refer to the same protocol specification but differ only in speed grades supported and non-material clarifications to the specification for the mainline bank configurations in 16 Bank mode and bank group (BG) mode.

In the LPDDR5 protocol specifications, a group of commands are defined, such as: DES, NOP, PDE, ACT-1, ACT-2, PRE, REF, MWR, WR, WR32, RD, RD32, CAS, etc.

Commands are transmitted on a command bus from the memory controller synchronously with a command clock. Most commands are one command clock cycle in duration. However, the ACTIVATE procedure, used to open a bank and make a row available for reading and writing, requires two command clock cycles.

The ACTIVATE procedure is accomplished with one ACT-1 command followed by one ACT-2 command. Thus, in LPDDR5, the ACT-1 and ACT-2 commands are precursor commands for the read and write commands.

The LPDDR5 specification allows the ACT-2 command to follow the ACT-1 command by exactly one clock cycle or, optionally, by multiple clock cycles in what is called a "split ACT". Typically, all read/write critical bank enable timing in the memory controller tracks the ACT-2 command, because both the ACT-1 and ACT-2 are required to begin reading or writing. Further, the scheduling of the ACTIVATE procedure relative to previous commands is relative to the issuance of the ACT-2 command. Herein, "tRRD" denotes a minimum time between consecutive ACT-2 commands specified for the memory controller. tRRD must be greater than or equal to the corresponding minimum time specified for a memory device. In one embodiment, tRRD may refer to a number of command clock cycles.

A memory controller may select a memory command every command clock cycle. The selection may be designed to maximum performance, such as utilization of the memory bus. In some embodiments, selection of a command in a clock cycle may be independent of the selection made in the previous or next clock cycle. In this case, two or more independent selections may be made to select precursor commands. For example, in LDDDR5, two independent selections (ACT-1 and ACT-2) may be made in order to complete the ACTIVATION procedure.

Figure 2:
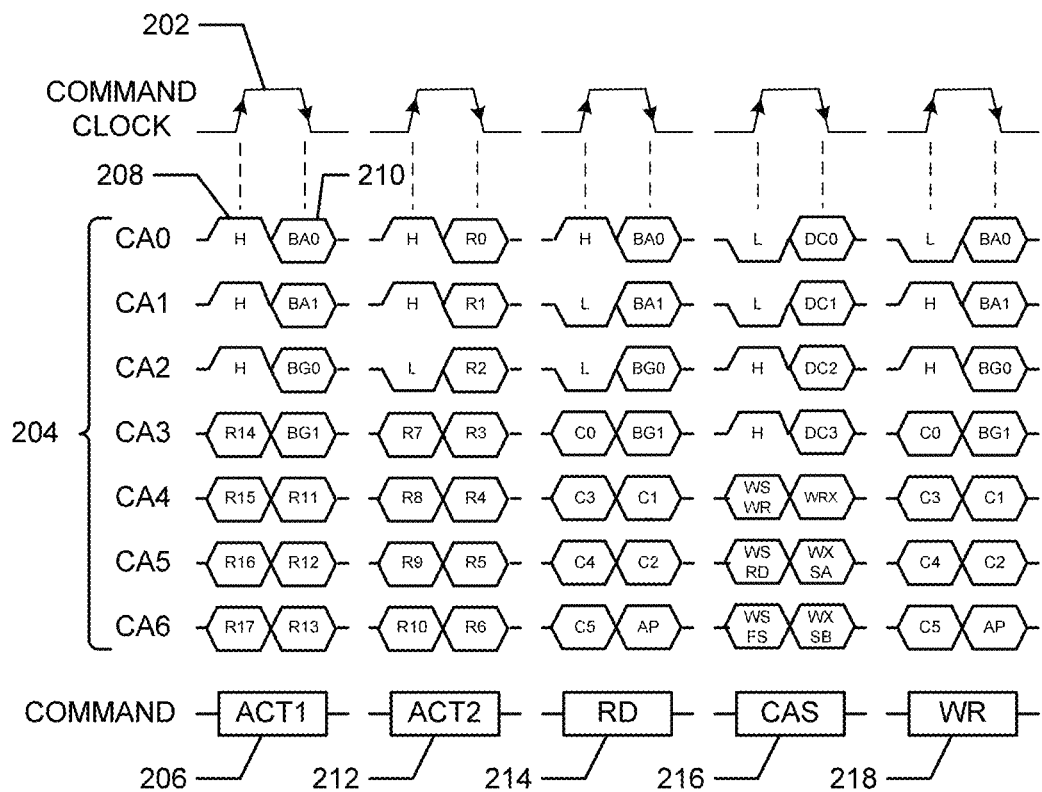
FIG. 2 is a diagrammatic representation of precursor commands, in accordance with various representative embodiments.

FIG. 2 is a diagrammatic representation of precursor commands, in accordance with various representative embodiments. The commands are sent synchronously with command clock signal 202. A double data rate is used, in which signals are sampled on both rising and falling edges of the command clock, as indicated by the arrows in signal 202. In this example, the command and address bus CA is 7-bits wide. Signals 204 show the signals on each of the seven wires (CA0-CA6) of the CA bus. In the figure, vertical alignment indicates temporal alignment. Thus, signals in columns 206 are sampled at the rising edge of the clock and signals in columns 208 are sampled at the falling edge of the clock. At the rising edge of the clock, lines CA0-CA2 indicate the command type.

The 14 signal bits sent on CA bus 204 are denoted as precursor command ACT1 (210), The ACT1 command indicates row address bits R14-R17 at the rising edge and indicates row address bits R11-R13, bank identifier bits BA0, BA1, BG0 and BG1 at the falling edge. Precursor command ACT2 (212) indicates row address bits R7-R10 at the rising edge and indicates row address bits R0-R6 at the falling edge. Thus, both ACT1 and ACT2 precursor commands are required to specify the 18-bit row address (R0-R17) and the memory bank. For a read command, the activate commands, together, cause the charge levels of the identified row to be sensed.

Read command RD (214) specifies a 6-bit column address C0-C5 and identifies the memory bank to be accessed. The AP bit is set if an automatic pre-charge is to be performed. Setting the automatic pre-charge bit in read and write commands indicates to the memory device that the read or write command is the last access to the currently opened row. The memory device then closes or pre-charges the page that is currently being accessed. The next access to the same bank is faster because the controller does not have to pre-charge the bank before activating the next row to be accessed.

Synchronization command CAS (216) specifies the type of clock synchronization to be performed. The WS_WR bit synchronizes for a write operation, the WS_RD bit synchronizes for a read operation, and the WS_FS bit synchronizes for a read or write operation.

Write command RD (218) specifies a 6-bit column address C0-C5 and identifies the memory bank (BA0, BA1, BG0, BG1) to be accessed. The AP bit is set if an automatic pre-charge is requested.

Other precursor commands include "PRE," which requests that a specified memory bank is pre-charged in preparation for access.

In general, timing constraints are associated with variety of memory commands. These include: ACT2, pre-charge, read with automatic pre-charge, write with automatic pre-charge, refresh. power down exit and self-refresh exit. The memory controller may maintain one or more counters and multiple comparators to ensure that the timing constraints are met. Different memory devices may have difference timing constraints.

Figure 3:
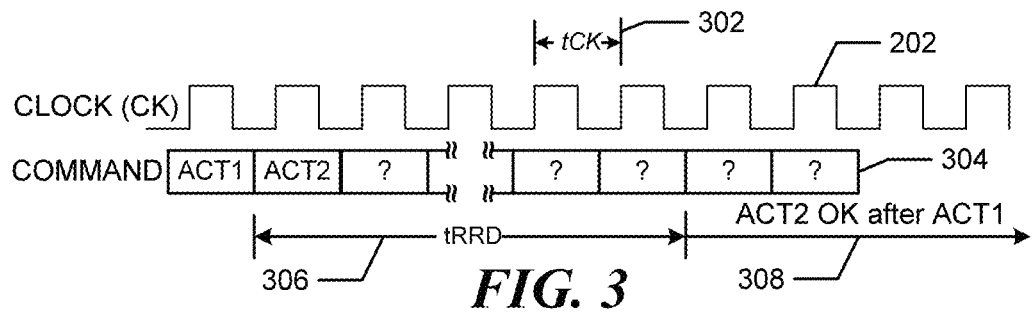
FIG. 3 is a diagrammatic representation of a scheduled command sequence.

FIG. 3 is a diagrammatic representation of a scheduled command sequence. Command clock CK is shown as 202 with time flowing from left to right. The command clock period is denoted as "tCK" (302). In the example command sequence 304, an ACT1 command is followed by an ACT2. In order to satisfy timing constraints imposed by the memory device, a subsequent ACT2 command cannot be sent until a time period tRRD (306) has elapsed. Thus, in time period 308 it is permitted for the command scheduler to select another ACT2 command-provided that a corresponding ACT1 has been selected in the interim.

Figure 4:
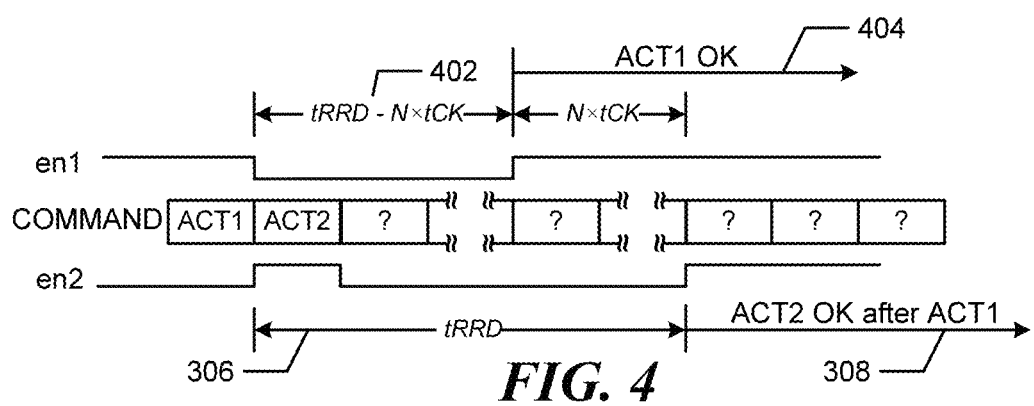
FIG. 4 is a diagrammatic representation of a scheduled command sequence, in accordance with various representative embodiments.

FIG. 4 is a diagrammatic representation of a scheduled command sequence, in accordance with various representative embodiments. As in FIG. 3, described above, a subsequent ACT2 command may be selected in time period 308 provided that a corresponding ACT1 has been selected in the interim. However, in accordance with an aspect of the disclosure, selection of an ACT1 command is permitted after time period 402 has elapsed. Thus, selection of an ACT1 command is permitted in time period 404. In one embodiment, time period 404 begins a number (N) of command clock cycles before time period 308. Time period 404 therefor begins a time tRRD−NxtCK after selection of the previous ACT2 command. Allowing ACT1 to be sent early (i.e. advanced or preponed) gives the command scheduler increased flexibility to select commands. For example, an ACT2 command could be immediately preceded by a read or write command.

Figure 5:
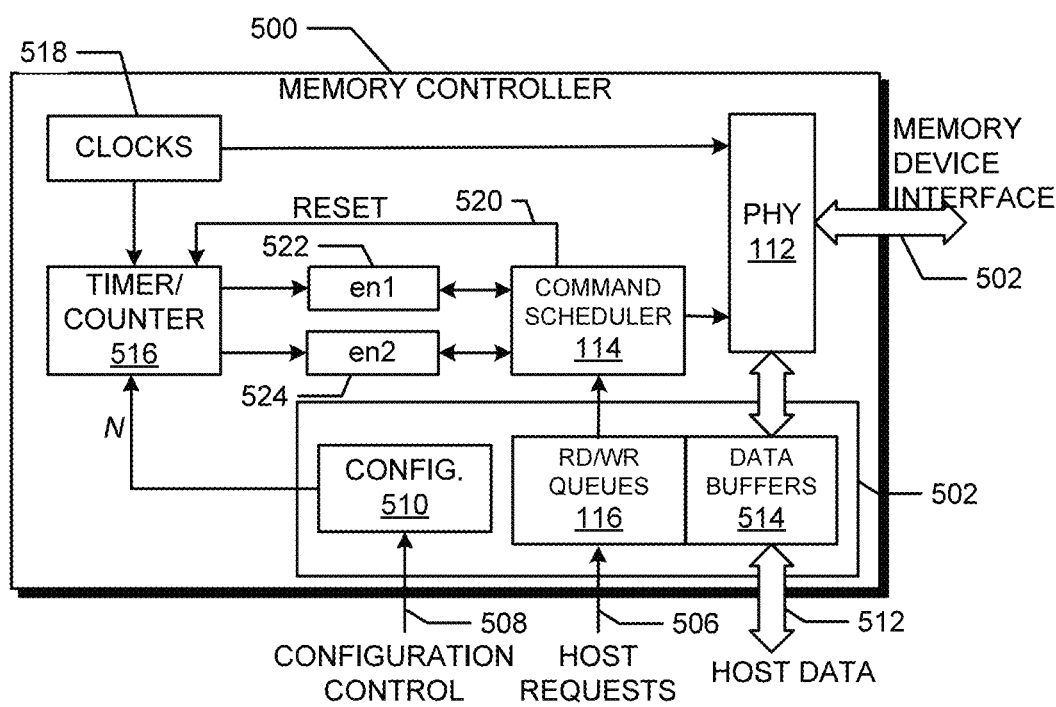
FIG. 5 is a block diagram of a memory controller, in accordance with various representative embodiments.

FIG. 5 is a block diagram of a memory controller 500, in accordance with various representative embodiments. Memory controller 500 couples signals 502 between a memory device and physical interface 112. Memory controller 500 also includes host interface 504 that couples the memory controller to a host requesting device. Memory access requests 506 are buffering and read and write queues 116 while configuration control signals 508 are couple to configuration control logic 510. Data 512 is transferred between a host requesting device and data buffers 514 of the memory controller.

Timing control for physical interface 112 and timer/counter 516 is provided by one or more clocks 518. Timer/counter 518 is reset by signal 520 when an ACT2 command is selected by command scheduler 114 and measures the time elapsed thereafter. In one embodiment, timer/counter 518 asserts a first logical value "en1" when a first time tRRD−NxtCK has elapsed and asserts a second logical value "en2" when a second time tRRD has elapsed. The logical values en1 and en2 may be indicated by setting values of registers 522 and 524, respectively. Alternatively, the logical values en1 and en2 may be indicated by asserting signals coupled to command scheduler 114.

The en1 indicator can assert a designated number of clock cycles (or time period) before the en2 indicator asserts. The command scheduler may choose to select and issue an ACT1 command when en1 is asserted. In addition, the ACT2 command need not be issued one clock cycle after the ACT1 is issued. In this respect, when the ACT1 command is issued two of more cycles before the ACT2 command, the ACTIVATE commands are "split" and the ACT1 command is said to be "speculative." In other words, an ACT1 command issued well before the expiration of tRRD is said to be "advanced". Any clock cycles between the ACT1 and ACT2 commands may be utilized optimally to pick high priority commands, such as read (RD) or write (WR) commands. In many cases, if RD or WR are not picked optimally on these specific clock cycle, then effective bandwidth is reduced dramatically from the potential maximum theoretical bandwidth.

In general, when tRRD=MxtCK, the ACT1 may be issued N clock cycles before the ACT2 is issued, where N is less than M.

Figure 6:
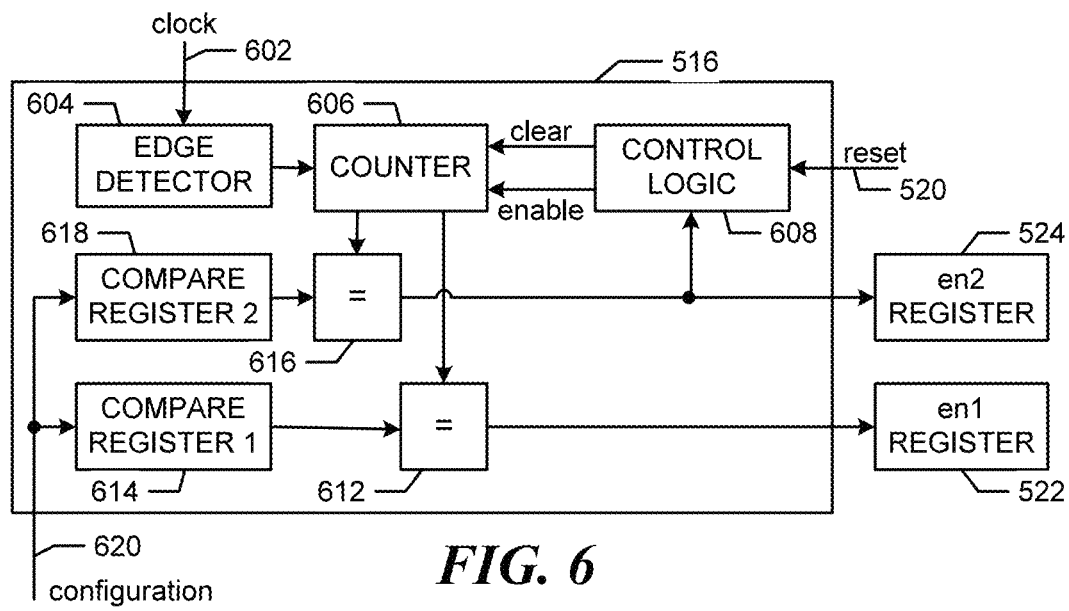
FIG. 6 is a block diagram of a timer/counter, in accordance with various representative embodiments.

FIG. 6 is a block diagram of a timer/counter 516, in accordance with various representative embodiments. Input clock 602 is supplied to edge detector 604 that, in turn, updates counter 606. Counter 606 is enabled and reset by control logic circuit 608. Reset signal 520 from a command scheduler indicates when a reset is needed. Comparator 612 compares a value of counter 606 with a first value stored in compare register 614 and updates en1 register 522 when a match occurs. In an alternative embodiment, a signal is asserted rather than a setting a register value. Comparator 616 compares a value of counter 606 with a second value stored in compare register 618 and updates en2 register 524 when a match occurs. Again, in an alternative embodiment, a signal is asserted rather than a setting a register value. The first and second comparison values may be set by configuration signal 620. These values may be configured by designer or by user software, for example.

In the example shown in FIG. 6, there are two comparison values corresponding to the ACT1 and ACT2 precursor commands. In general, there may be any number of precursor commands with a corresponding number of comparison values and comparators. Other embodiments will be apparent to those of skill on the art. For example, a separate may be used for each time period. A counter may count up from zero, or count down to zero from a comparison value.

Figure 7:
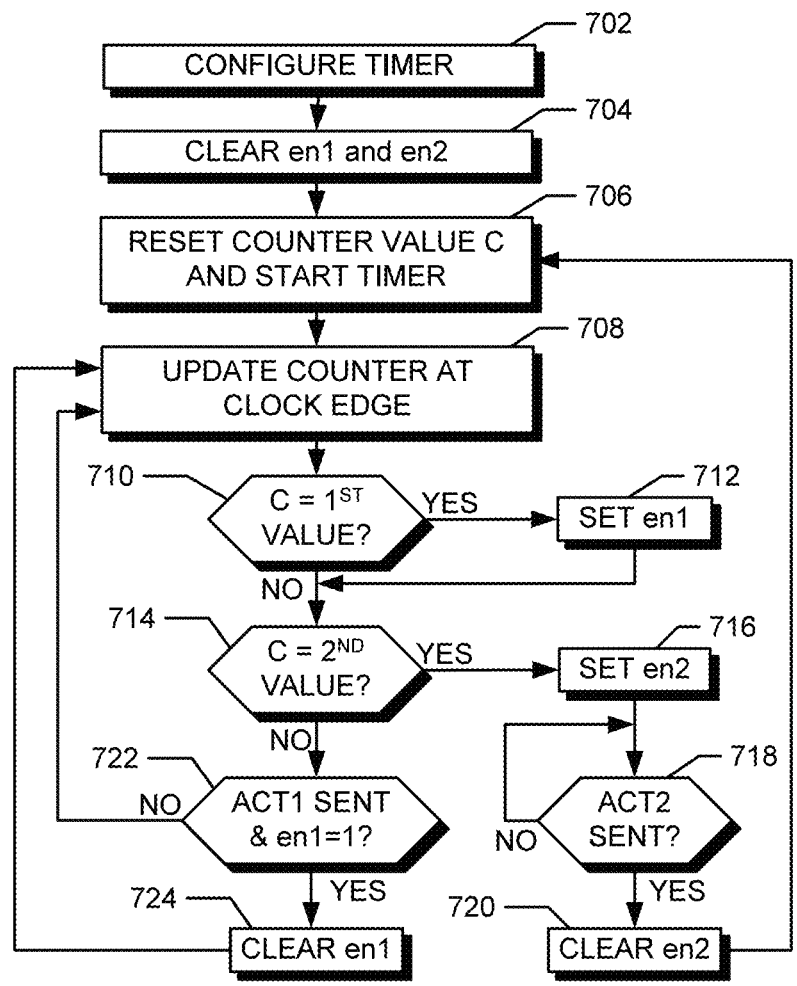
FIG. 7 is a flow chart of a method of operation of a timer/counter, in accordance with various representative embodiments.

FIG. 7 is a flow chart of a method 700 of operation of a timer/counter, in accordance with various representative embodiments. At block 702, a timer/counter is configured by setting first and second comparison values. At block 704, en1 and en2 registers are cleared. In an alternative embodiment, en1 and en2 signals are de-asserted. At block 706, a counter value is reset in response to a reset signal from a command scheduler. The reset signal may indicate selection of an ACT2 precursor command, for example. At block 708 the counter value "C" is updated in response to a clock edge. This may be an edge of a command clock, for example. If the counter value C is equal to the first comparison value, as depicted by the positive branch from decision block 710, the en1 register is set at block 712 (or an en1 signal asserted).

If the counter value C is equal to the second comparison value, as depicted by the positive branch from decision block 714, the en2 register is set at block 716 (or an en2 signal asserted). The method then waits at decision block 718 until, as depicted by the positive branch from decision block 718, an ACT2 command is sent (as signaled by the command scheduler, for example). The en2 register is then cleared at block 720 and flow returns to block 706. If the counter value has not reached the second comparison value, as depicted by the negative branch from decision block 714, flow continues to decision block 722. If the ACT1 command has been sent but the en1 register has not been cleared, the en1 register is cleared at block 724 and flow returns to block 708. If the ACT1 command has not been sent, or the en1 registers is not set, as depicted by the negative branch from decision block 722, flow returns to block 708.

Figure 8:
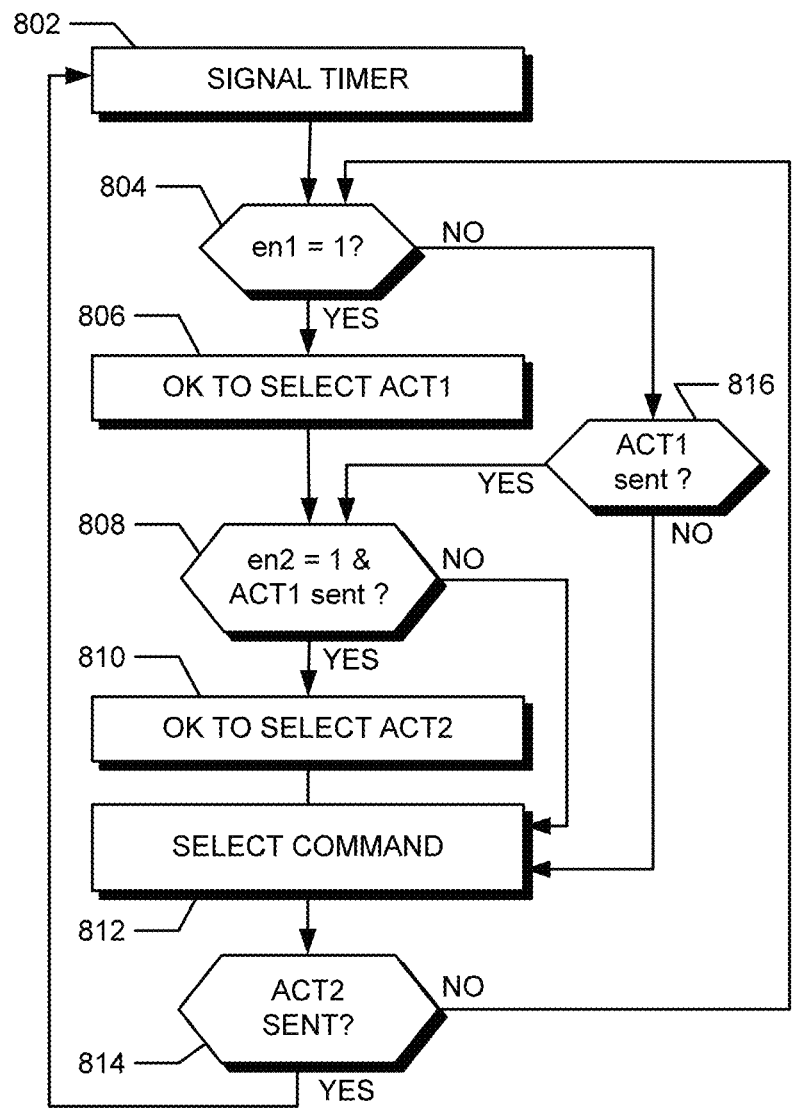
FIG. 8 is a flow chart of a method of a command scheduler, in accordance with various representative embodiments.

FIG. 8 is a flow chart of a method 800 of a command scheduler, in accordance with various representative embodiments. At block 802, a timer/counter is signaled to reset en1 and en2 values. These may be signal values or stored values. In en1 is asserted, as depicted by the positive branch from decision block 804, the scheduler is configured at block 806 to allow selection of an ACT1 command. If en2 is asserted and an ACT1 command has been sent, as depicted by the positive branch from decision block 808, the scheduler is configured at block 810 to allow selection of an ACT2 command. At block 812, the scheduler selects a next command to be sent to the memory device. If an ACT2 command has been sent, as depicted by the positive branch from decision block 814, flow returns to block 802 and the time/counter is signaled to indicate that a new measurement period should be started. If en1 is not asserted, as depicted by the negative branch from decision block 804, flow continues to decision block 816. If ACT1 has been sent (i.e., en1 has been de-asserted) flow continues to decision block 808. Otherwise, flow continues to block 812. If en2 is not asserted or ACT1 has not been sent, as depicted by the negative branch from decision block 808, flow continues to block 812. In this manner, scheduling of memory commands is controlled by en1 and en2 values that, in turn, are controlled by the timer/counter circuit.

In one embodiment, commands for each memory bank are stored in a first-in, first-out (FIFO) buffer. In this case, ACT1 precedes ACT2 in the FIFO and there is no requirement to check if ACT1 has been sent at blocks 808 and 816 since ACT2 cannot be sent before ACT1.

Figure 9:
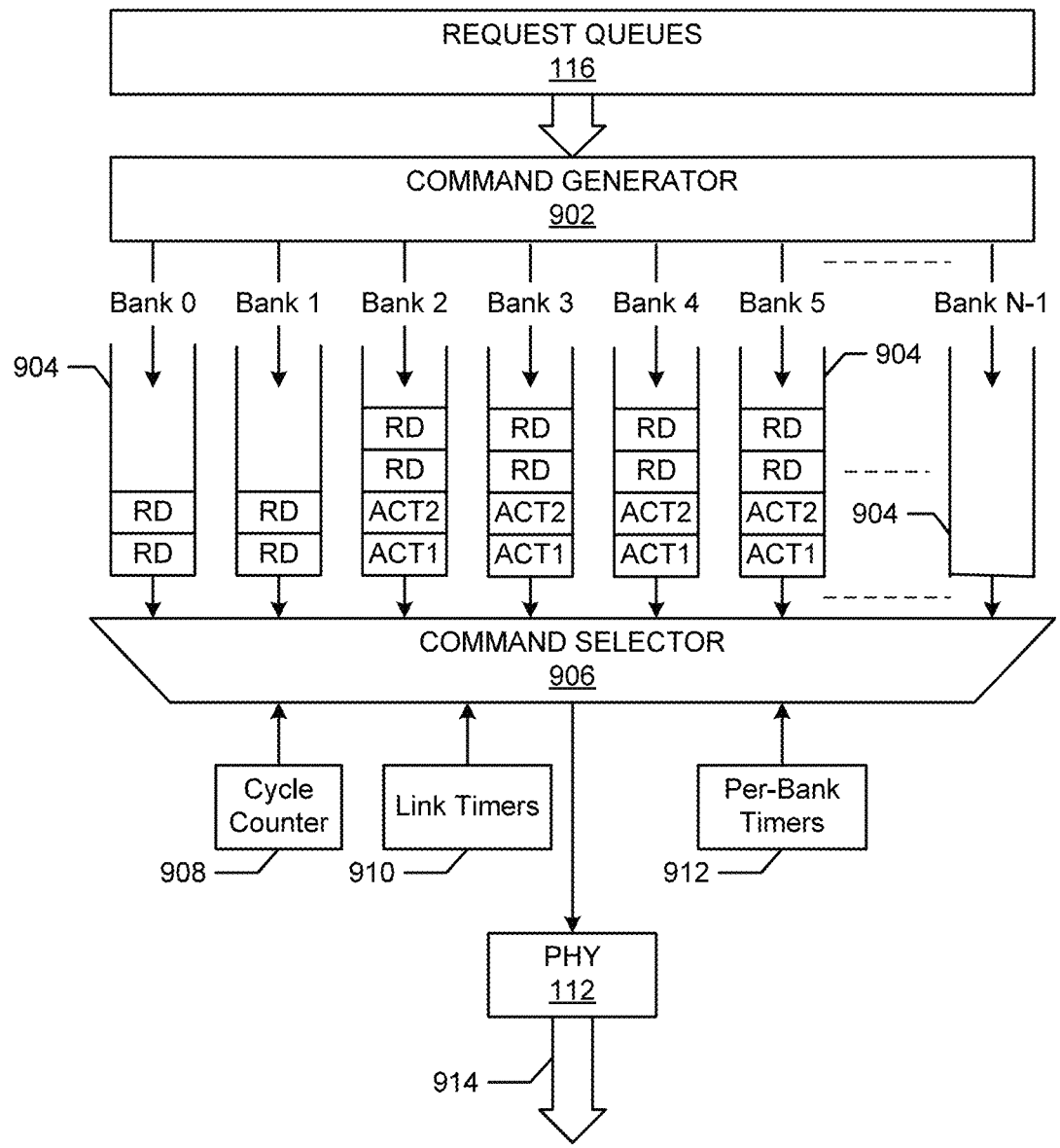
FIG. 9 is a block diagram showing components of a memory controller, in accordance with various representative embodiments.

FIG. 9 is a block diagram showing components of a memory controller, in accordance with various representative embodiments. Command generator 902 receives memory access requests form request queues 118 and generates memory access commands therefrom. In particular, memory addresses are decoded to identify the corresponding bank number, row address and column address in the memory. The generator commands are buffered in FIFO command buffers 904. While only six FIFO command buffers are shown in the figure, the number of buffers should match the number of banks in the memory. For example, there would be 16 FIFO buffers for a memory with 16 banks. In the memory device, the memory banks can be accessed in parallel. However, the command bus and the data bus can only transmit for one bank at a time. In each cycle of the command clock, command selector 906 can pick a command from one of the FIFO command buffers and pass it to the PHY physical interface 112. The command is sent to the memory device via connection 914. Command selector 906 is subject to a number of constraints. Firstly, in each block of eight commands, read and write commands can only be sent in cycle 0 and cycle 2. Thus a cycle counter 908 is provided. Secondly, the time between certain precursor commands (such as ACT2-to-ACT1 and ACT2-ACT2) is constrained to be at least a minimum value. Appropriate timing information is provided by link timers 910. Thirdly, the time between an ACT2 command and a read or write command to the same memory bank is constrained to be at least a minimum value. Appropriate timing information is provided by per-bank timers 912. As described above, an aspect of the present disclosure is the provision of an ACT2-to-ACT1 timer which increases the number of cycles in which an ACT1 command can be selected. This increased flexibility enables the memory controller to provide better utilization of the data bus, for example.

FIG. 10 is a table showing a scheduled command sequence, in accordance with various representative embodiments. Column 1002 shows the selected memory command for a number of clock cycles. Column 1004 shows the memory bank specified in the command. Column 1006 shows the value of the en1 indicator (1=asserted, 0=de-asserted). Column 1008 shows the value of the en2 indicator (1=asserted, 0=de-asserted). In this example, the minimum time tRRD between ACT2 commands is set at four command clock cycles. I.e., tRRD=4×tCK, as indicated by arrows 1010. In addition, the ACT1 enable indicator en1 is asserted 3 cycles before en2 is asserted, as indicated by arrows 1012. In the example shown, selection of ACT1 is enabled in cycle −2 (as indicated by en1=1), and ACT1 is selected in this cycle. ACT2 is not enabled until cycle 1 (i.e., three cycles later). Thus, ACT1 is advanced. This frees the command scheduler to select a read command for bank 0 in cycle 0 and a read command for bank 1 in cycle 2. Similarly, the ACT1 command in cycle 7 is advanced since the ACT2 command is not allowed until cycle 9.

In the example shown in FIG. 10, the minimum time between activation of a row and reading the row is 15 cycles. Thus, the row of bank 2 activated at cycle 1 cannot be read until cycle 16. An additional read to the row in bank 2 is made at cycle 18.

For comparison, FIG. 11 is a table showing a scheduled command sequence, for the same set of commands when advancing or speculating selection of the ACT1 command is not permitted. As in FIG. 10, ACT2 is not enabled until cycle 1. As a result, ACT1 cannot be selected until cycle 0. However, to maximize throughput, a pending read command (RD) is selected in cycle 0. An ACT1 for bank 2 is selected in cycle 1. To maximize throughput, a pending read command (RD) is selected in cycle 2, delaying the ACT2 command for bank 2 until cycle 3. Since the minimum time between activation of a row and reading the row is 15 cycles, the row of bank 2 activated at cycle 3 cannot be read until cycle 18. An additional read to the row in bank 2 is therefore delayed until cycle 24. Thus, compared to the command sequence shown in FIG. 10, read latency is increased. In addition, in FIG. 10 all cycles available for read commands (0, 2, 8, 10, 16 and 18) are utilized, whereas in FIG. 11 slot 16 is used for an ACT2 command. As a results, the command sequence in FIG. 10 make better use of the data bus.

Figure 12:
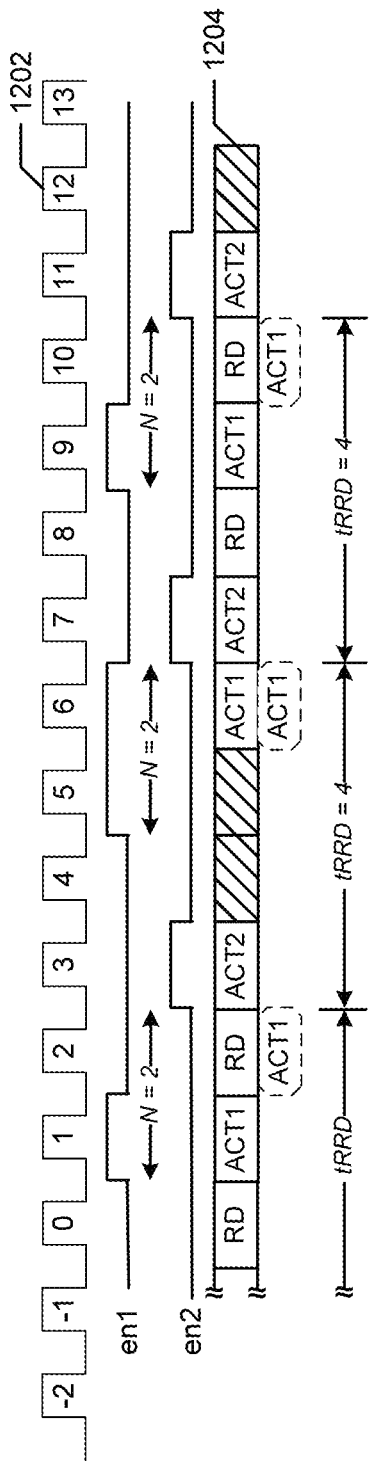
FIG. 12 is a diagrammatic representation of a scheduled command sequence, in accordance with various representative embodiments.

FIG. 12 is a diagrammatic representation of a scheduled command sequence, in accordance with various representative embodiments. FIG. 12 shows command clock signal 1202 and command sequence 1204. In this example, the minimum time tRRD between ACT2 commands is set at four command clock cycles. I.e., tRRD=4×tCK. In addition, the ACT1 enable indicator en1 is set at tRRD−2×tCK=2×tCK. In the example, tRRD expires prior to clock cycle 3, as indicated by the en12 indicator going high. This allows the command scheduler to select an ACT2 command for cycle 3. The ACT1 command is selected two cycles earlier in cycle 1. Indicator en1 goes high two cycles before indicator en2 goes high, indicating that selection of the ACT1 command is allowed. Indicator en1 goes low again when ACT1 is selected. In prior systems, an ACT1 command could not be selected until cycle 2, as indicated by command 1206. In accordance with the memory device protocol, read and write commands may only be sent in cycle n, where n modulo 8 is equal to zero or two. Thus, read commands can be sent in cycles 0, 2, 8 and 10 in the figure. In the example shown, the first two read commands are sent in cycles 0 and 2. In a prior system, if the ACT1 command was placed in cycle 2, a read command would be delayed by size cycles. Conversely, if the read (RD) command was placed in cycle 2, the ACT1 and ACT2 commands would be delayed--thereby delaying the read command associated with them. Thus, enabling the ACT1 command to be sent early, or "speculatively", results in reduced read latency. Similarly, the third ACT1 command in sequence 1204 is sent early (in cycle 9), freeing a cycle for an additional read (RD) command. The ACT1 and ACT2 commands are "split" and separated by a read (RD) command.

Figure 13:
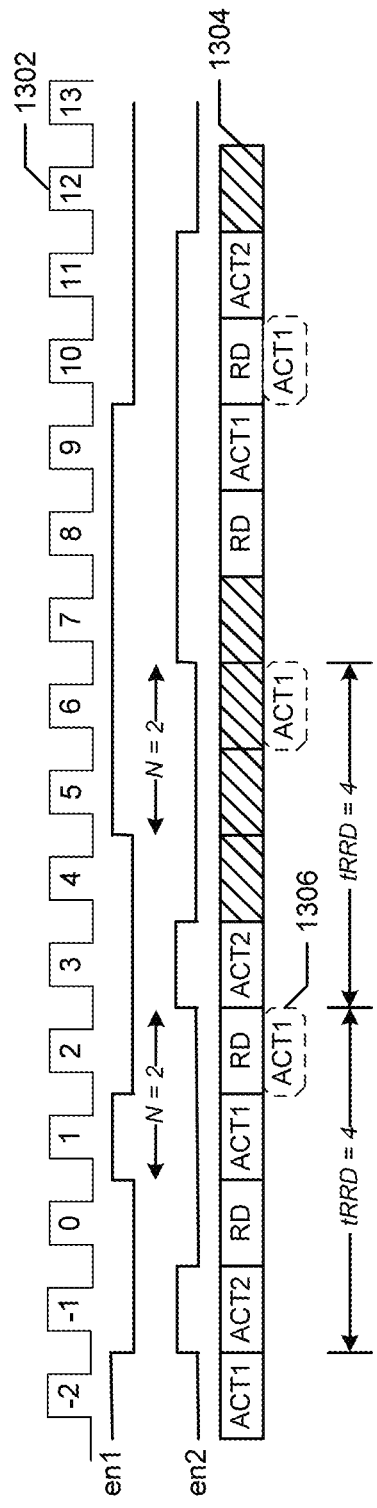
FIG. 13 is a diagrammatic representation of a scheduled command sequence, in accordance with various representative embodiments.

FIG. 13 is a diagrammatic representation of a scheduled command sequence, in accordance with various representative embodiments. FIG. 13 shows command clock signal 1302 and command sequence 1304. In this example, the minimum time tRRD between ACT2 commands is again set at four command clock cycles and the ACT1 indicator en1 is asserted at time tRRD−2×tCK=2×tCK after the ACT2 command. In this example, the ACT1 command selected in cycle 1 is advanced or speculative in that it is sent one cycle early. Without speculative selection of the ACT1 command, the ACT1 command would be sent in cycle 2, as indicated by 1306. It is noted that the en1 indicator is asserted after cycle 4, and remains asserted until after the ACT1 command is selected in cycle 9. The en1 indicator is then de-asserted to prevent the command scheduler from selecting an ACT1 command for a different bank.

FIGS. 14-16 show diagrammatic representations of further scheduled command sequences, in accordance with various representative embodiments.

In FIG. 14, ACT2 commands are enabled in cycles 1 and 9. The ACT1 commands in cycles −1 and 7 are advanced with N=2, freeing a cycle for read commands (RD) in cycles 0, 2, 8 and 10.

In FIG. 15, an ACT2 command is enabled in cycle 1. The ACT1 command in cycles −2 is advanced with N=3 and the ACT2 command in cycle 3 is delayed by 2 cycles. This allows synchronization (CAS) commands to be sent in cycles −1 and 1, and for write (WR) commands to be sent in cycles 0 and 2.

In FIG. 16, an ACT2 command is enabled in cycle 0. The ACT1 command in cycles −2 is advanced with N=2 and the ACT2 command in cycle 3 is delayed by 3 cycles. Again, this allows synchronization (CAS) commands to be sent in cycles −1 and 1, and for write (WR) commands to be sent in cycles 0 and 2.

In this manner, allowing for ACT1 commands to be advanced increases the efficiency of the memory access.

The above description discloses a method of accessing a memory by a memory controller. The method includes indicating expiration of a first time period and indicating expiration of a second time period. The first time period is shorter than the second time period by a designated amount and the second time period is greater than or equal to a specified minimum time between a prior memory access command and a secondary precursor memory access command of a memory access protocol including primary and secondary precursor memory access commands. A command scheduler of the memory controller is enabled to allow selection of a primary precursor memory access command when the first time period has expired and enabled to allow selection of a secondary precursor memory access command when the second time period has expired. The command scheduler selects a memory access command and sends it to the memory. The first and second time periods are begun when a prior precursor memory access command has been sent to the memory.

In one embodiment, indicating expiration of the first time period includes setting a first register and indicating expiration of the second time period includes setting a second register. The method includes clearing the first and second registers when a secondary precursor memory access command has been sent to the memory.

In one embodiment, the memory controller buffers memory access requests received from a host processor and generates memory access commands based on the access requests.

The primary and secondary precursor memory access commands may specify a memory bank of the memory and a row address in the memory bank to be activated, for example.

Enabling the command scheduler to allow selection of the secondary precursor memory access command may also be dependent on one or more additional memory operations.

The secondary precursor memory access command may be followed by selection of a read command, a write command, a synchronization command and a read command, a synchronization command and a write command of the memory access protocol, or a combination thereof.

The primary and secondary precursor memory access commands may be separated by a read command, a write command, a synchronization command and a read command, a synchronization command and a write command of the memory access protocol, or a combination thereof.

In one embodiment, indicating expiration of the first and second time periods includes updating a counter value in each cycle of a memory controller clock, comparing the counter value to a first value, indicating expiration of the first time period when the counter value is equal to the first value, comparing the counter value to a second value, and indicating expiration of the second time period when the counter value is equal to the second value.

The above description also discloses memory controller that includes a command scheduler, a timer and an interface configured to transmit the memory access commands to a memory. The command scheduler is configured to select memory access commands associated with memory access requests received via a host interface. The timer is configured to indicate, to the command scheduler, expiration of a first time period and expiration of a second time period. The first time period is shorter than the second time period by a designated amount and the second time period is greater than or equal to a minimum time between a prior memory access command and a secondary precursor memory access command in a memory access protocol having primary and secondary precursor memory access commands. The first and second time periods begin when the prior memory access command is sent to the memory. The command scheduler allows selection of a primary precursor memory access command when the first time period has expired and allows selection of a secondary precursor memory access command when the second time period has expired and a corresponding primary precursor memory access command has been sent to the memory.

In one embodiment, the interface includes a physical interface to a Dynamic Random Access Memory (DRAM) device, a Static Dynamic Random Access Memory (SDRAM) device, a Double Data Rate Static Dynamic Random Access Memory (DDR SDRAM) device or Low Power Double Data Rate Static Dynamic Random Access Memory (LPDDR SDRAM) device, with the memory access protocol being a protocol for a DRAM, SDRAM, DDR SDRAM or LPDDR SDRAM device.

In one embodiment, the command scheduler includes a memory access command generator configured to generate one or more memory access commands based on a stored memory access request.

The memory controller may also include first and second registers coupled to the timer. The content of the first register is set to a first value (e.g., 1) when the first time period expires and set to a second value (e.g., 0) when the secondary precursor memory access command has been sent to the memory. The content of the second register is set to a third value (e.g., 1) when the second time period expires and set to a fourth value (e.g., 0) when the secondary precursor memory access command has been sent to the memory.

In one embodiment, the primary and secondary precursor memory access commands specify a memory bank of the memory and a row address in the memory bank to be activated and the command scheduler is further configured to select a pre-charge command for a row address in the memory band and disallow selection of the secondary precursor memory access command until the pre-charge command has been sent.

The timer may include a counter configured to update a counter value based on a clock of the memory controller, a first comparator configured to compare the counter value to a first value and indicate expiration of the first time period when the counter value is equal to the first value, and a second comparator configured to compare the counter value to a second value and indicate expiration of the second time period when the counter value is equal to the second value. Alternatively, the timer may include a first counter configured to update a first counter value based on a clock of the memory controller, a first comparator configured to compare the first counter value to a first value and indicate expiration of the first time period when the first counter value is equal to the first value, a second counter configured to update a second counter value based on a clock of the memory controller and a second comparator configured to compare the second counter value to a second value and indicate expiration of the second time period when the second counter value is equal to the second value.

An embodiment of the disclosure provides a non-transitory computer-readable medium storing computer-readable code for fabrication of a memory controller. The memory controller includes a command scheduler, timer and physical interface. The command schedular is configured to select memory access commands associated with memory access requests received via a host interface. The timer is configured to indicate, to the command scheduler, expiration of a first time period and expiration of a second time period. The physical interface is configured to transmit the memory access commands to a memory. The first time period is shorter than the second time period by a designated amount and the second time period is greater than or equal to a minimum time between a prior memory access command and a secondary precursor memory access commands in a memory access protocol having primary and secondary precursor memory access commands. The first and second time periods begin when the prior memory access command is sent to the memory. The command scheduler allows selection of a primary precursor memory access command when the first time period has expired and allows selection of a secondary precursor memory access command when the second time period has expired, and a corresponding primary precursor memory access command has been sent to the memory.

The timer may include a counter configured to update a counter value based on a clock of the memory controller, a first comparator configured to compare the counter value to a first value and indicate expiration of the first time period when the counter value is equal to the first value, and a second comparator configured to compare the counter value to a second value and indicate expiration of the second time period when the counter value is equal to the second value.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioral representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted, without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of accessing a memory by a memory controller, comprising:
   indicating expiration of a first time period;
   indicating expiration of a second time period, where:
   the first time period is shorter than the second time period by a designated amount; and
   the second time period is greater than or equal to a specified minimum time between a prior memory access command and a secondary precursor memory access command of a memory access protocol having a plurality of memory access commands including primary and secondary precursor memory access commands;
   enabling a command scheduler of the memory controller to allow selection of a primary precursor memory access command when the first time period has expired;

enabling the command scheduler to allow selection of a secondary precursor memory access command when the second time period has expired and a corresponding primary precursor memory access command has been sent to the memory;

selecting, by the command scheduler, a memory access command;

sending the selected memory access command to the memory; and beginning the first and second time periods when the prior memory access command has been sent to the memory.

2. The method of claim 1, where indicating expiration of the first time period includes setting a first register and indicating expiration of the second time period includes setting a second register, further comprising:

clearing the first and second registers when a secondary precursor memory access command has been sent to the memory.

3. The method of claim 1, further comprising the memory controller:

buffering memory access requests received from a host processor; and generating memory access commands based on the access requests.

4. The method of claim 1, where the primary and secondary precursor memory access commands specify a memory bank of the memory and a row address in the memory bank to be activated.

5. The method of claim 1, where the second time period is dependent upon a memory device time constraint associated with at least one of:

a prior secondary precursor memory access command;
a "pre-charge" command of the memory access protocol,
a "read with automatic pre-charge" command of the memory access protocol,
a "write with automatic pre-charge" command of the memory access protocol,
a "refresh" command of the memory access protocol,
a "power down exit" command of the memory access protocol, or
a "self-refresh exit" command of the memory access protocol.

6. The method of claim 1, where the selected memory access command is the secondary precursor memory access command and where selection of the secondary precursor memory access command is followed by selection of at least one of:

a read command of the memory access protocol;
a write command of the memory access protocol;
a synchronization command and a read command of the memory access protocol; or
a synchronization command and a write command of the memory access protocol.

7. The method of claim 1, where the primary and secondary precursor memory access commands are separated by at least one of:

a read command of the memory access protocol;
a write command of the memory access protocol;
a synchronization command and a read command of the memory access protocol; or
a synchronization command and a write command of the memory access protocol.

8. The method of claim 1, where indicating expiration of the first and second time periods includes:

updating a counter value in each cycle of a memory controller clock;
comparing the counter value to a first value;
indicating expiration of the first time period when the counter value is equal to the first value:
comparing the counter value to a second value; and
indicating expiration of the second time period when the counter value is equal to the second value.

9. A memory controller for a memory comprising:

a command scheduler configured to select memory access commands associated with memory access requests received via a host interface;

a timer configured to indicate, to the command scheduler, expiration of a first time period and expiration of a second time period, where:

the first time period is shorter than the second time period by a designated amount;

the second time period is greater than or equal to a minimum time between a prior memory access command and a secondary precursor memory access command in a memory access protocol having primary and secondary precursor memory access commands; and the first and second time periods begin when the prior memory access command is sent to the memory; and an interface configured to transmit the memory access commands to the memory;

where the command scheduler allows selection of a primary precursor memory access command when the first time period has expired and allows selection of a secondary precursor memory access command when the second time period has expired and a corresponding primary precursor memory access command has been sent to the memory.

10. The memory controller of claim 9, where the interface includes a physical interface to a Dynamic Random Access Memory (DRAM) device, a Static Dynamic Random Access Memory (SDRAM) device, a Double Data Rate Static Dynamic Random Access Memory (DDR SDRAM) device or Low Power Double Data Rate Static Dynamic Random Access Memory (LPDDR SDRAM) device and where the memory access protocol is a protocol for a DRAM, SDRAM, DDR SDRAM or LPDDR SDRAM device.

11. The memory controller of claim 9, where the command scheduler includes a memory access command generator configured to generate one or more memory access commands based on a stored memory access request.

12. The memory controller of claim 9, further comprising:

a first register coupled to the timer, the content of which is set to a first value when the first time period expires and set to a second value when the secondary precursor memory access command has been sent to the memory; and a second register coupled to the timer, the content of which is set to a third value when the second time period expires and set to a fourth value when the secondary precursor memory access command has been sent to the memory.

13. The memory controller of claim 9, where the primary and secondary precursor memory access commands specify a memory bank of the memory and a row address in the memory bank to be activated.

14. The memory controller of claim 9, where the second time period is further dependent upon a memory device time constraint associated with at least one of:

a prior secondary precursor memory access command,
a "pre-charge" command of the memory access protocol,
a "read with automatic pre-charge" command of the memory access protocol,
a "write with automatic pre-charge" command of the memory access protocol, a "refresh" command of the memory access protocol,
a "power down exit" command of the memory access protocol, or
a "self-refresh exit" command of the memory access protocol.

15. The memory controller of claim 9, where the command scheduler is configured to select the secondary precursor memory access command and, following selection of the secondary precursor memory command, select at least one of:
   a read command of the memory access protocol;
   a write command of the memory access protocol;
   a synchronization command and a read command of the memory access protocol; or
   a synchronization command and a write command of the memory access protocol.

16. The memory controller of claim 9, where the command scheduler is configured to:
   select the primary precursor memory access command;
   following selection of the primary precursor memory command, select, as an access sequence, at least one of:
      a read command of the memory access protocol;
      a write command of the memory access protocol;
      a synchronization command and a read command of the memory access protocol; or
      a synchronization command and a write command of the memory access protocol; and
   following selection of the access sequence, select the secondary precursor memory command.

17. The memory controller of claim 9, where the timer includes:
   a counter configured to update a counter value based on a clock of the memory controller;
   a first comparator configured to compare the counter value to a first value and indicate expiration of the first time period when the counter value is equal to the first value; and
   a second comparator configured to compare the counter value to a second value and indicate expiration of the second time period when the counter value is equal to the second value.

18. The memory controller of claim 9, where the timer includes:
   a first counter configured to update a first counter value based on a clock of the memory controller;
   a first comparator configured to compare the first counter value to a first value and indicate expiration of the first time period when the first counter value is equal to the first value;
   a second counter configured to update a second counter value based on the clock of the memory controller; and
   a second comparator configured to compare the second counter value to a second value and indicate expiration of the second time period when the second counter value is equal to the second value.

19. A non-transitory computer-readable medium storing computer-readable code for fabrication of a memory controller comprising:
   a command scheduler configured to select memory access commands associated with memory access requests received via a host interface;
   a timer configured to indicate, to the command scheduler, expiration of a first time period and expiration of a second time period, where:
      the first time period is shorter than the second time period by a designated amount;
      the second time period is greater than or equal to a minimum time between a prior memory access command and a secondary precursor memory access commands in a memory access protocol having primary and secondary precursor memory access commands; and
      the first and second time periods begin when the prior memory access command is sent to the memory; and
   a physical interface configured to transmit the memory access commands to a memory,
where the command scheduler allows selection of a primary precursor memory access command when the first time period has expired and allows selection of a secondary precursor memory access command when the second time period has expired and a corresponding primary precursor memory access command has been sent to the memory.

20. The non-transitory computer-readable medium of claim 19, where the timer includes:
   a counter configured to update a counter value based on a clock of the memory controller;
   a first comparator configured to compare the counter value to a first value and indicate expiration of the first time period when the counter value is equal to the first value; and
   a second comparator configured to compare the counter value to a second value and indicate expiration of the second time period when the counter value is equal to the second value.

* * * * *